May 22, 1956 H. E. ALTGELT 2,746,370

HITCH DEVICE

Filed March 28, 1952 3 Sheets-Sheet 1

INVENTOR.
HERMAN E. ALTGELT

BY Roger C Johnson

ATTORNEY

INVENTOR.
HERMAN E. ALTGELT
BY Roger C. Johnson
ATTORNEY

May 22, 1956 H. E. ALTGELT 2,746,370

HITCH DEVICE

Filed March 28, 1952 3 Sheets-Sheet 3

INVENTOR.
HERMAN E. ALTGELT
BY
Roger C. Johnson
ATTORNEY

United States Patent Office 2,746,370
Patented May 22, 1956

2,746,370

HITCH DEVICE

Herman E. Altgelt, Moline, Ill., assignor to Deere & Company, Moline, Ill., a corporation of Illinois Application March 28, 1952, Serial No. 279,199

6 Claims. (Cl. 97—47.14)

The present invention relates generally to agricultural implements and more particularly to hitch devices for connecting ground-engaging, ground-working, or ground-following implements with tractors having propelling and raising and lowering means for receiving, supporting, and propelling the associated implements.

The object and general nature of the present invention is the provision of a new and improved hitch device for connecting an implement with a tractor in such a way as to facilitate attaching and detaching the implement while, at the same time, permitting the implement to move relative to the tractor when in operation, whereby the implement may readily follow uneven ground surface. More specifically, it is a feature of this invention to provide a new and improved hitch device which includes a supporting or attaching frame adapted to be connected directly with the tractor and with which ground-engaging or ground-working means is flexibly connected, with means whereby, when the implement is disconnected from the tractor, the supporting or attaching frame may be supported on the implement in a position to readily facilitate reconnecting the implement with the tractor. Still further, another feature of the present invention is the provision of means for supporting an attaching or supporting frame on an implement or implement units, when the attaching or supporting frame is disconnected from its propelling tractor, with means whereby the implement or implement units are readily moved relative to the supporting or attaching frame in operation when the frame is carried by the tractor. An additional feature of this invention is the provision of a new and improved latch means for facilitating the connection and disconnection of the attaching or supporting frame relative to the tractor, particularly a tractor of the type having upper and lower links and associated raising and lowering means.

These and other objects and advantages of the present invention will be apparent to those skilled in the art after a description of the preferred embodiment of this invention, taken in conjunction with the accompanying drawings illustrating such embodiment.

Figure 1:
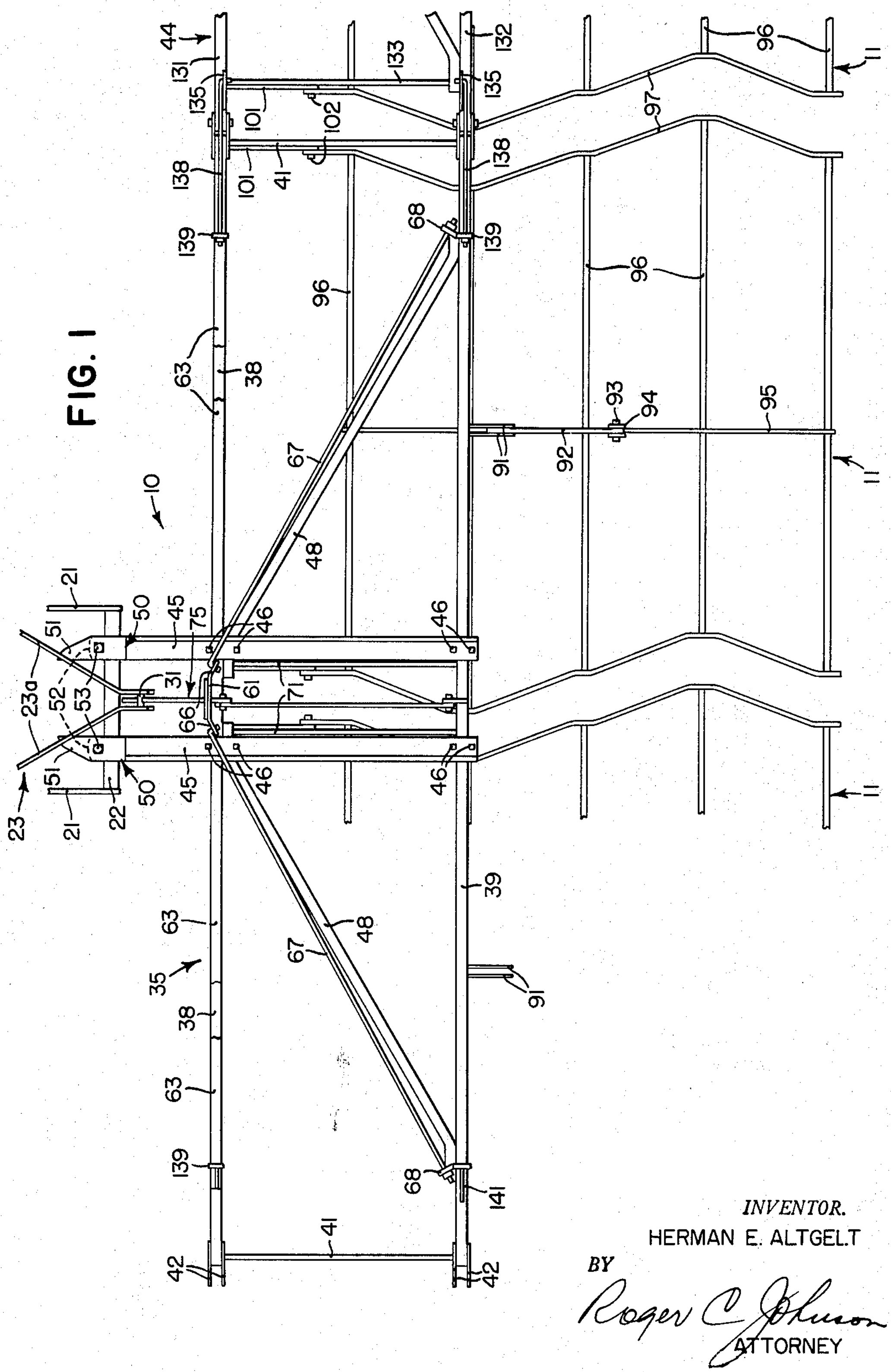
Figure 1 is a plan view of an implement in which the principles of the present invention have been incorporated, certain portions being omitted in the interests of clarity.
Figure 4:
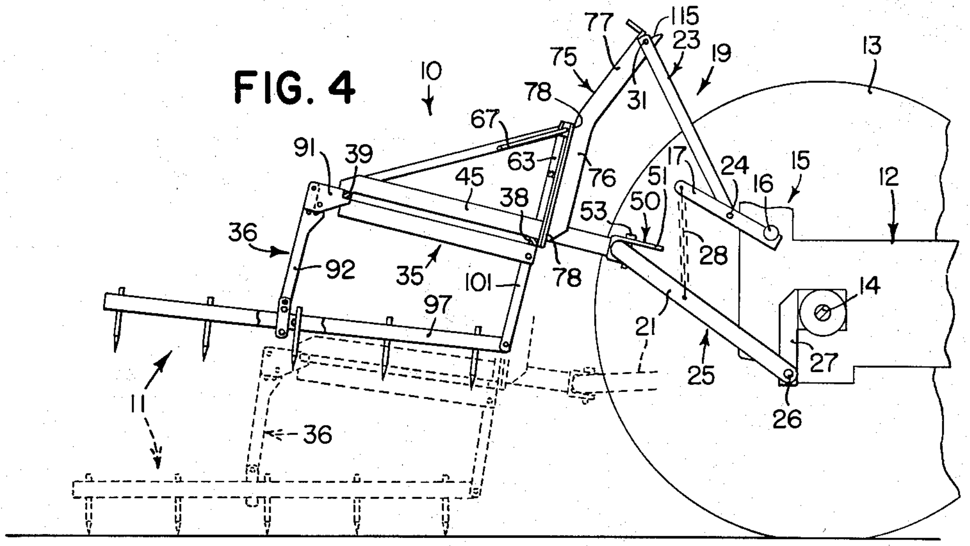
Figure 4 is a side view of the hitch device of the present invention and the associated implement unit or units, showing the same relative to the tractor when the implement units are raised into their transport position.

Referring first to Figure 4, the hitch device of the present invention is indicated in its entirety by the reference numeral 10 and is shown in the accompanying drawings as connecting a plurality of implement units in the form of peg tooth harrow sections 11 to a tractor 12 of the type which includes a pair of rear traction wheels 13 carried on axle shafts 14 that are journaled in an axle housing at the rear of the tractor. The latter also includes a power lift structure 15 which comprises a transverse rockshaft 16 on which a pair of vertically swingable lift arms 17 are fixed. The tractor 12 also includes an attaching linkage 19 which comprises a pair of lower links 21, preferably connected together by a crossbar 22 (Figure 1) to form a rigid vertically swingable bail structure, and an upper compression link member 23. The latter preferably is a bifurcated structure and has its forward ends pivotally connected, as at 24, to the lift arms 17, and the forward ends of the lower links 21, which with the crossbar 22 comprise a bail 25, are pivotally connected at 26 to a pair of draft brackets 27 carried by the rear portion of the tractor, one at each side of the axle housing. The lift arms are connected at their rear ends through lift links 28 with the links 21, whereby lifting movement imparted to the lift arms 17 is transmitted to the bail 25 and may therefore be used to raise the implement connected with the tractor into its transport position. As best shown in Figure 1, the upper link member 23 comprises a pair of rearwardly converging bars 23*a* fixed together adjacent their rear ends by a cross pin 31, which serves as means for connecting an implement or implement part to the tractor. The tractor 12 also includes suitable power means for controllably actuating the rockshaft 16.

The hitch device 10, in which the principles of the present invention have been incorporated, includes an upper supporting or attaching frame 35 and specially formed link means 36 for connecting the peg tooth harrow sections 11, or other implement means, to the frame 35. The latter is made up of a transverse front bar 38, a rear transverse bar 39, end bars 41 secured, as by welding, to the ends of the front and rear bars 38 and 39. Also secured to the ends of the latter bars is a plurality of laterally outwardly extending pairs of brackets 42 that are apertured to receive suitable pivot means by which outrigger frame sections, indicated generally at 44, are adatped to be connected to the attaching frame 35, as will be described in detail later. The frame 35 also includes a pair of fore-and-aft extending draft angles 45 that are fixed by suitable bolt means 46 to the front and rear frame bars 38 and 39. The latter bars are reenforced in a horizontal plane by diagonally extending bars 48 which are fixed at their front and rear ends to the front and rear crossbars 38 and 39 by any suitable means, such as by welding or the like. Secured to the front end of each of the draft bars 45 is a U-shaped socket member 50 which includes upper and lower, vertically spaced apart sections 51 and 52 apertured to receive a pair of hitch pins 53, the parts being so constructed that when the frame 35 is attached to the tractor, the hitch pins 53 lie immediately ahead of the crossbar 22 of the bail 25 when the crossbar 22 seats in the socket members 50. The upper section 51 extends forwardly beyond the end of the lower section 52 to facilitate bringing the crossbar 22 into seating position in the socket members 50.

Also forming a part of the attaching or implement-supporting frame 35 is a vertical plate section 61 that is secured at its lower end, as by winding, to the forward side of the front frame bar 38. Forward brace bars 63 are secured, as by welding, at the laterally inner ends to the upper end portion of the vertical plate 61 and extend downwardly and laterally outwardly, generally in the vertical transverse plane of the front bar 38, and are fixed, as by welding, to the laterally outer end portions of the front cross frame bar 38, as indicated at 64 in the left-hand portion of Figure 1. The upper end of the vertical plate 61 is also provided with a pair of laterally outwardly and rearwardly extending apertured ears 66 which receive the rearwardly turned ends of a pair of rod braces 67 that extend downwardly laterally outwardly and rearwardly to attaching brackets 68 that are fixed to the laterally outer end portions of the rear frame bar 39, relatively closely adjacent the rear and laterally outer ends of the horizontal brace bars 43. Centrally of the frame 35, generally underneath the draft angles 45, is a pair of fore-and-aft extending bars 71, the bars 71 being disposed generally in parallelism with respect to the end bars 41 and fastened to the front and rear frame bars 38 and 39 in a similar manner.

A mast section 75 is fixed to the forward portion of the frame 35 and comprises a generally vertical bar 76 having an upwardly forwardly extending section 77. The lower portion of the mast section 75 is fixed to the vertical plate section 61 in any suitable manner, as by upper and lower apertured brackets 78 and associated bolt or other fastening means 79.

Figures 2, 3:
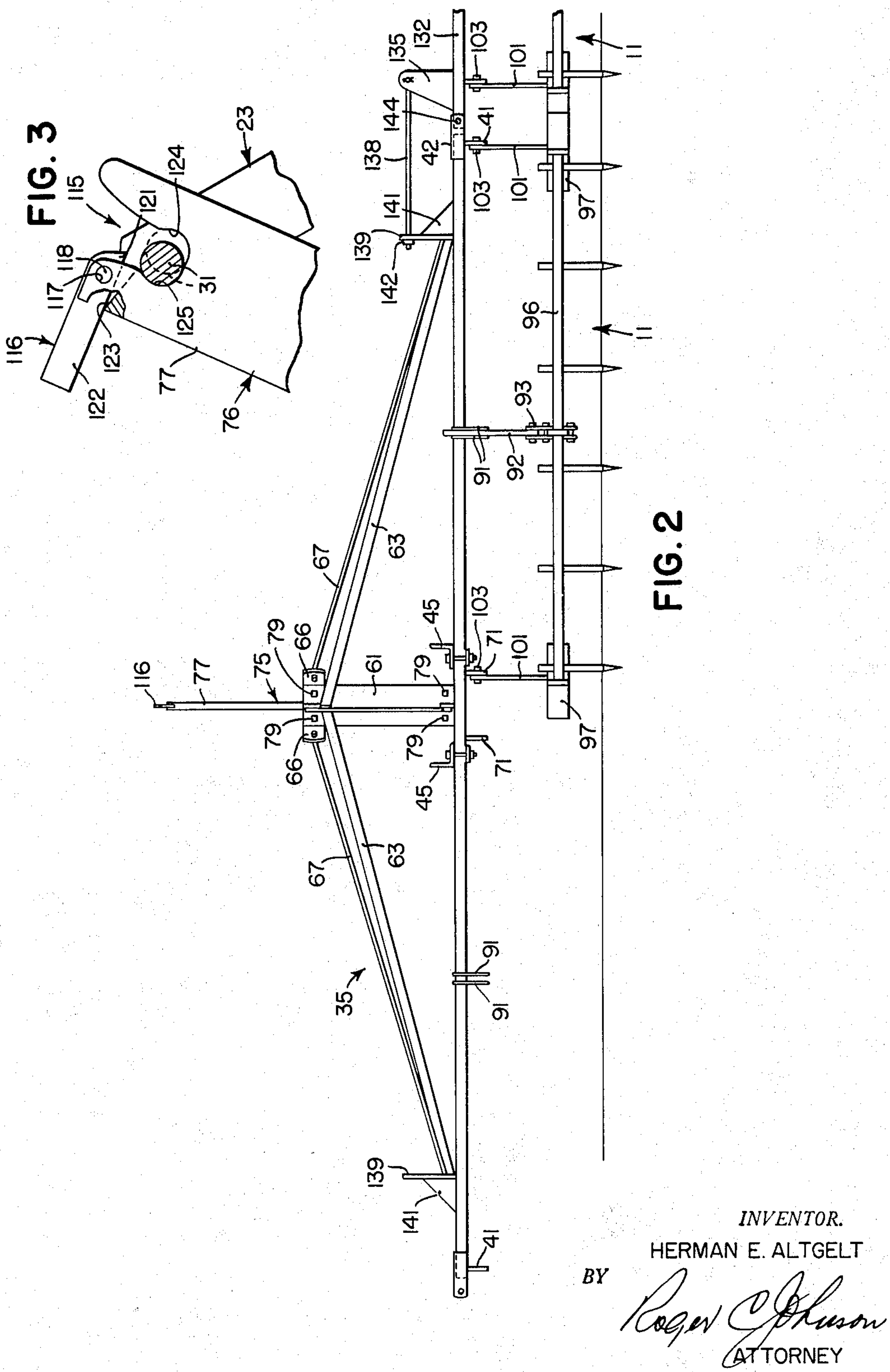
Figure 2 is a rear view, looking forwardly, of the implement structure shown in Figure 1.
Figure 3 is an enlarged detail view of the new and improved latch construction embodied in the present invention.

A pair of center peg tooth harrow sections 11, which represent any suitable form of ground-engaging or ground-following implement units, are connected with the frame 35 by means which are especially constructed and arranged to support the frame 35 in an elevated position when the implement units and the associated hitch frame are disconnected from the tractor. Referring first to Figures 1 and 2, two pairs of bracket plates 91 are fixed in any suitable way, as by welding, to the rear frame bar 39. A link member 92 is received between the bracket plates 91 of each pair and at its lower end each link 92 is pivotally connected, as at 93, to an attaching bracket 94 that is fixed to and forms a part of the center frame bar 95 of the associated peg tooth harrow section 11. Each section 11 is of conventional construction, so far as the principles of the present invention are concerned, each section including a plurality of tooth bars 96 and a pair of suitably formed end bars 97. At its forward end each harrow section 11 is connected with the frame 35 through a pair of generally vertical links 101. Each link 101 is pivotally connected at its lower end, as at 102, with the forward end of the associated harrow section end bar 97, and at its upper end each link member 101 is connected, as at 103, with the forward end of the associated frame bar 41.

Figures 5, 6:
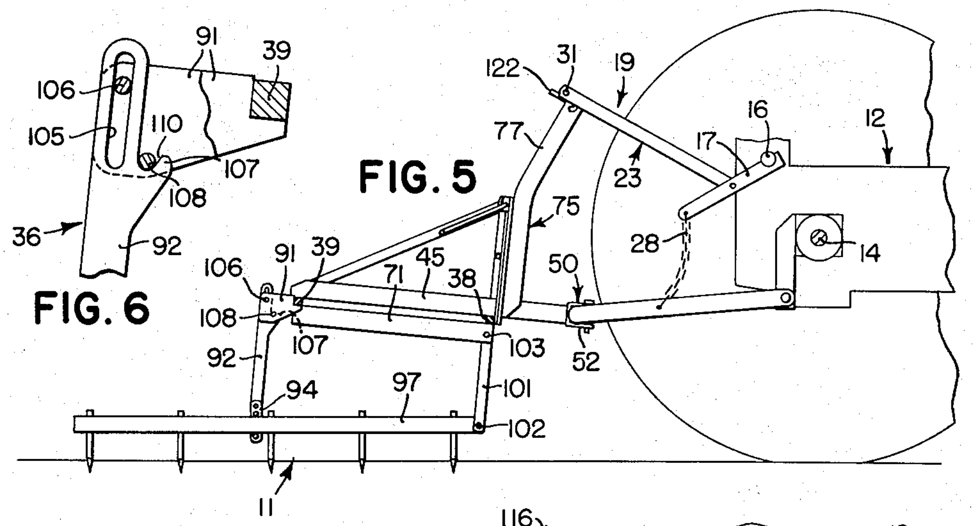
Figure 5 is a view similar to Figure 4, showing the positions of the several parts when the supporting or attaching frame is supported on the implement in a position facilitating the reconnection of the hitch device and implement units with the associated propelling tractor.
Figure 6 is an enlarged detail view of a portion of the means which carries the attaching frame on the implement when the frame is disconnected from the tractor.

The upper end of each of the two rear links 92 is slotted, as at 105, each slot 105 extending generally vertically or longitudinally of the associated link 92, and a pivot pin 106, carried by the associated bracket plates 91, is disposed in the slot 105 of the associated link 92. An extension 107 is formed at the forward side of the upper end of each of the links 92 and is adapted to cooperate with an abutment pin 108 fixedly carried by the associated bracket plates 91. The pins 106 and 108 are so disposed that, as best shown in Figures 5 and 6, when the frame 35 is lowered toward the implement unit 11, with the latter substantially directly underneath the frame 35 and the links 92 and 101 substantially vertical, each pin 106 will move downwardly in the associated slot 105 and also each pin 108 will enter the socket 110 formed by the extension 107, as best shown in Figure 6, the pin being guided in its downward movement of the front edge of the slotted upper end of the link 92, for when the harrow is raised the links 92 are limited in their forward swinging by the pins 108, as will be seen from Figure 4. The walls of the socket 110 are so angled, with respect to the slot 105, that when the frame 35 and links 92 are arranged as shown in Figures 5 and 6, the links 92, and also the links 101, are held against swinging relative to either the attaching frame 35 or the associated implement means 11. However, looking at Figures 5 and 7, when the frame 35 is connected with the tractor and the latter driven forwardly, the links 92 and 101 move into a generally trailing position, the links 101 serving as draft-transmitting means connecting the frame 35 and the implement unit 11. The length of the rear links 92, particularly the slots 105 thereof, is such that normally the pins 106 occupy a position about half way between the ends of the associated slots 105, whereby the implement unit 11 may swing upwardly or downwardly at its rear end relative to the frame 35, the latter being carried generally by the tractor and limited in its downward movement by the associated power lift mechanism that is connected with the bail 25 to the lift arms 17 and lift links 28.

Figure 7:
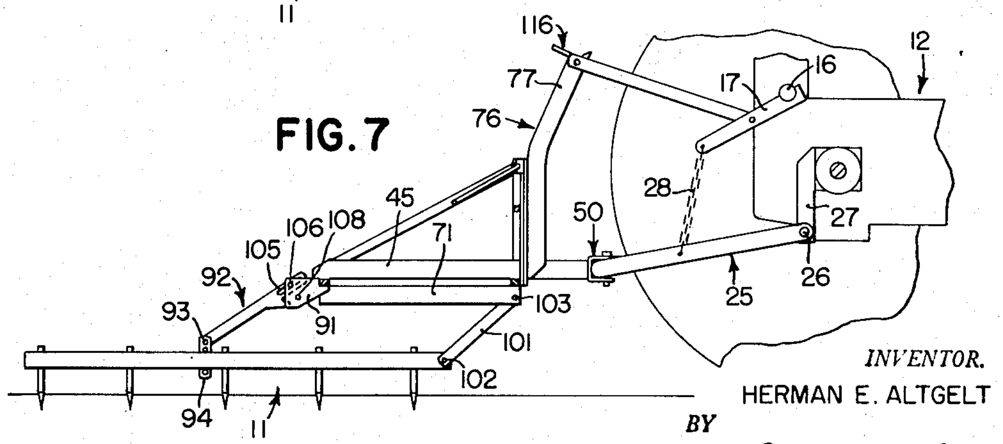
Figure 7 is a view similar to Figures 4 and 5, showing the implement units and associated parts in the positions they occupy when in operation.

The upper end portion 77 of the mast bar 76 is formed with an upwardly facing socket 115, formed as best shown in Figure 3. The upper portion 77 of the mast section is bifurcated to form the socket 115 and the rear portion is formed with a vertical slot to receive a latch lever 116 and is apertured, as at 117, to receive a pivot 118 by which the latch lever 116 is mounted for rocking movement on the mast section. The latch lever 116 includes a forward nose section 121 extending partially into the socket 115 and a rear or handle section 122 that is extended rearwardly an appreciable amount. The slotted portion of the upper end of the mast, as indicated at 123, is formed to serve as a stop to limit the downward swinging of the latch lever 116 beyond the position shown in Figure 3. The latch lever 116 may, however, be swung upwardly to permit the pin 31 to lie in the bottom of the socket 115. The lower portion of the socket 115 is provided with forward and rearward recesses 124 and 125 shaped so that normal operating stresses serve to hold the pin 31 either in the recess 124 or in the recess 125. In operation, as shown in Figure 7, the mast section 76 tends to be swung forwardly at its upper end, thereby introducing compressive stresses in the upper link 23, and as a result the pivot pin 31 tends to lie in the rear recess 125 (Figure 3). On the other hand, when the tractor power lift is operated to swing the lift arms 17 and the bail 25 upwardly to hold the implement unit suspended out of contact with the ground for transport purposes, the upper end of the mast section 77 tends to swing rearwardly, and therefore the upper link 23 is subjected to tension and the pivot pin 31 tends to lie in the forward notch 124, as shown in dotted lines in Figure 3. In either case, of course, the pin is kept from becoming dislodged and released from the socket 115 by the lever 116. However, when the latch 116 is manually swung upwardly, the nose section 121 moves rearwardly and permits the pin 31 to readily move out of the upper end of the socket 115.

If it should be desired to use more than two implement units 11, the outrigger frames 44 mentioned above may be provided. Each of these frames, there being one at each side of the attaching frame 35, is constructed similarly to the attaching frame 35 and includes front and rear bars 131 and 132, with associated end bars 133. Each of the outrigger frames carries upwardly extending brackets 135, and each of the latter brackets is connected by tension links 138 with a bracket 139 that is formed on the front and rear frame bars 38 and 39. The brackets 139 are reenforced by suitable gussets 141, and the upper end of each of the brackets 139 is apertured to receive the inner threaded end of the tension rod 138. The threaded end carries a lock nut 142 by which the outrigger frames 44 may be leveled with respect to the inner frames. The laterally innermost ends of the front and rear outrigger frame bars 131 and 132 are pivotally connected, as at 144, with the pivot brackets 42 mentioned above, the bracket plates 42 being fixed at the ends to the front and rear main frame bars 38 and 39. Implement units 11 may be connected, respectively, to the outrigger frames 44 by links 92 and 101, substantially like the construction described above except that the links 92 need not have the extensions 107, because the weight of the main frame 35 as well as any outrigger frames 44 may be carried on the two inner implement units 11 by virtue of the socket extensions 107 of the central link 92 and the associated abutment pins 110.

The operation of the hitch device of the present invention is substantially as follows.

When it is desired to transport the ground-engaging or ground-following implement means 11 from one place to another, the tractor power lift apparatus is placed in operation to raise the bail 25 substantially to the position shown in Figure 4. This acts through the attaching frame 35 and associated links 92 and 101 to suspend the implement units 11 in a raised position, entirely out of contact with the ground. As mentioned above, during this operation the upper link 23 is subjected to tensile forces, and the pin 31 at the rear end of the upper link 23 normally lies in the forward recess 124 (dotted lines, Figure 3). When the operator reaches the field to be worked, the tractor power lift is operated so as to lower the implement onto the ground, the parts moving substantially to the positions shown in Figure 7, in which the implement units 11 trail, draft being transmitted thereto substantially entirely through the forward links 101.

When it is desired to store the implement, the latter is raised into a transport position and the outfit driven to the point of storage. The operator then actuates the tractor power lift to lower the implement units to the ground. As the implement units 11 approach the ground, the rearmost portions first contact the ground, and then as the power lift is actuated to cause the bail 25 to lower further, the resulting downward movement of the frame 35 relative to the implement causes the abutment pins 108 to settle into the sockets 110. During this action the forces on the link 23 are reversed, that is, the pin 31 at the rear end of the upper link 23 starts to move out of the forward notch 124 (dotted lines, Figure 3) toward the other notch 125. At this time, the operator manipulates the latch lever 116, raising the rear end upwardly and, at the same time, applies an upwardly directed force against the upper link 23. Therefore, at the moment that the pin 31 clears the forward recess 124, the operator can raise the rear link 23 entirely out of the notch 115. Before beginning the lowering operation, the operator will have pulled out the hitch pins 53, and therefore as soon as the implement units 11 settle onto the ground, with the hitch frame 35 supported in an upper position relative thereto, as indicated in Figure 5, the tractor may readily be driven away from the implement, leaving the attaching frame 35 in a position to facilitate re-connection with the tractor when it is desired again to use the implement. When this occurs, the tractor is backed toward the frame 35, supported as just mentioned, raising or lowering the bail 25 so as to cause the crossbar 22 to enter the socket members 50. At this time, the upper link 23 of the tractor draft linkage will occupy the position shown in Figure 5, with the pin 31 thereof rearwardly of the notch 115. However, the pin is supported by the extension 122 of the latch lever 116 so that, as will be seen from Figure 3, when the crossbar 22 is seated in the socket members 50, the hitch members 53 reinserted, and the power lift actuated to raise the implement, the upper end of the mast 77 shifts rearwardly and substantially immediately the pin 31 reaches and falls into the socket 115. The latch lever 116 is free to pivot upwardly as the pin 31 passes into the socket 115. Thus, the upper link 23 of the tractor is automatically connected with the upper portion of the implement mast structure.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural implement, a propelling frame, draft-transmitting links spaced apart fore-and-aft, means for pivotally connecting the forward link with the frame and implement whereby when the frame is propelled along the ground a propelling force is transmitted to the implement, means for pivotally connecting the lower end of the rear link with said implement, the upper end of said rear link having a slot extending generally longitudinally thereof, a pivot member carried by said frame and extending through said slot for pivotally connecting said rear link with said frame, an upwardly facing socket carried by said rear link adjacent said slot, and an abutment carried by said frame and adapted to be received by said socket for locking the rear link against pivoting relative to said frame when the rear link is in a generally upright position and said frame is lowered relative to the rear link to cause said pivot member to move to the lower end of said slot.

2. In an agricultural implement, a propelling frame, draft-transmitting links spaced apart fore-and-aft, means for pivotally connecting the forward link with the frame and implement whereby when the frame is propelled along the ground a propelling force is transmitted to the implement, one end of the rear link having a slot extending generally longitudinally thereof, a pivot member extending through said slot for pivotally connected one end of the rear link with the associated one of said implement and frame, means pivotally connecting the other end of said rear link with the other of said implement and frame, a socket carried by said one end of said rear link adjacent said slot, and an abutment carried by said one of said implement and frame and adapted to be received by said socket for locking the rear link against pivoting relative to said frame when the rear link is in a generally upright position and said frame is lowered relative to the rear link to cause said pivot member to move to the lower end of said slot.

3. A tractor mounted agricultural implement, comprising a supporting frame adapted to be detachably carried on the tractor, a ground-engaging implement unit, rigid link means pivotally connected with said frame and implement unit for suspending said unit from said frame for transport and for trailingly connecting said unit with said frame for ground-engaging operation, an extension on at least one of said link means, said one link means being movable relative to said frame and implement unit, and means carried by said frame and movable along and guided by an edge of said one link means into a position engaging said extension for holding the frame in an elevated position relative to the implement unit when said frame is disconnected from the tractor.

4. An agricultural machine adapted to be connected with a tractor having implement propelling means adapted to be raised and lowered, said machine comprising a supporting frame adapted to be releasably connected with said implement propelling means, a ground-engaging unit, suspension links connecting said unit with said frame, means connecting one of said links with one of said frame and unit and providing for a limited amount of generally vertical and pivotal movement of said frame toward said unit, link-engaging means on said one of said frame and unit and engaging a portion of said one link to limit swinging of the latter in one direction, and socket means on said one link to engage said link-engaging means and lock said link against movement in the opposite direction.

5. In an agricultural implement, a propelling frame, draft-transmitting links spaced apart fore-and-aft, means for pivotally connecting the forward link with the frame and implement whereby when the frame is propelled along the ground a propelling force is transmitted to the implement, means for pivotally connecting the lower end of the rear link with said implement, the upper end of said rear link having a slot extending generally longitudinally thereof, a pivot member carried by said frame and extending through said slot for pivotally connecting said rear link with said frame, an upwardly facing socket carried by said rear link adjacent said slot, and an abutment carried by said frame and guidingly engageable with the adjacent edge of the said rear link when the latter moves relative to the propelling frame as the latter is raised and lowered, the abutment being received by said socket for locking the rear link against pivoting relative to said frame when the rear link is in a generally upright position and said frame is lowered.

6. A hitch device for connecting a ground-following implement with the raising and lowering means of a tractor, said device comprising a supporting frame having means to receive the raising and lowering means of the tractor, fore-and-aft spaced apart links adapted to be connected for generally fore-and-aft swinging movement at their lower ends with said implement, means for connecting the upper ends of said links with said supporting frame, said means including lost-motion means acting between one of said links and said frame so as to permit relative movement between said frame and said one link, link-engaging means carried by said supporting frame and engageable with a portion of said link to limit swinging of said link relative to the supporting frame when the latter is raised, and socket means on said link to embrace said link-engaging means when the frame is lowered relative to the implement, whereby the frame is held in upright position on the implement when the supporting frame is disconnected from the tractor raising and lowering means.

References Cited in the file of this patent

UNITED STATES PATENTS

| | | |
|---|---|---|
| 1,696,245 | Manly | Dec. 25, 1928 |
| 2,129,745 | Seammell et al. | Sept. 13, 1938 |
| 2,239,387 | Johnson | Apr. 22, 1941 |
| 2,346,330 | Ratcliff | Apr. 11, 1944 |
| 2,363,749 | Rude | Nov. 28, 1944 |
| 2,527,355 | Cook et al. | Oct. 24, 1950 |
| 2,551,870 | Bridger | May 8, 1951 |
| 2,561,614 | Dixon | July 24, 1951 |
| 2,576,780 | Court | Nov. 27, 1951 |
| 2,579,086 | Oehler | Dec. 18, 1951 |

FOREIGN PATENTS

| | | |
|---|---|---|
| 602,887 | Great Britain | June 4, 1948 |